July 1, 1958        I. A. FAUST        2,841,451
MECHANIC'S SAWHORSE
Filed May 20, 1957        2 Sheets-Sheet 1
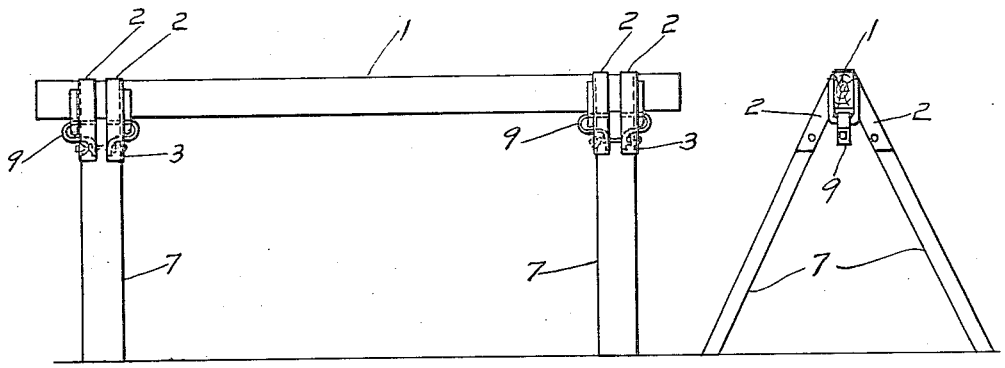
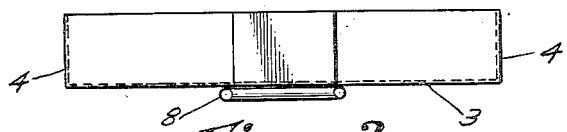
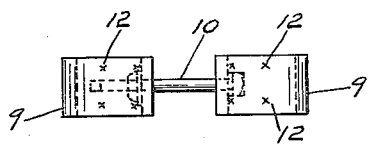
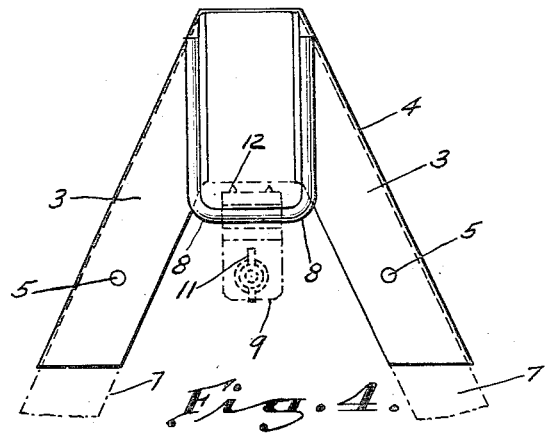
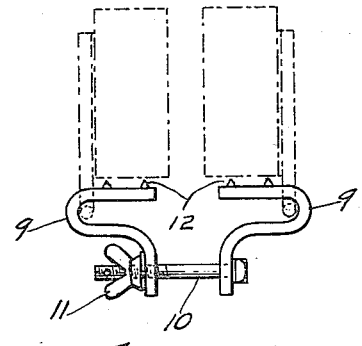
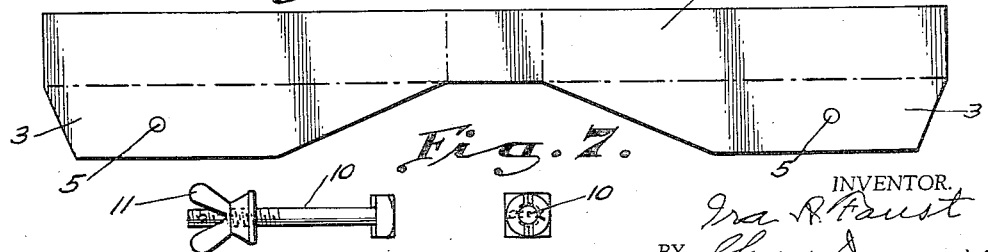
INVENTOR.
Ira R. Faust
BY Chas Denegre
Attorney July 1, 1958        I. A. FAUST        2,841,451

MECHANIC'S SAWHORSE

Filed May 20, 1957        2 Sheets-Sheet 2

INVENTOR.
Ira A. Faust
BY Chas. Denegre
Attorney.

United States Patent Office 2,841,451
Patented July 1, 1958

2,841,451

MECHANIC'S SAWHORSE

Ira A. Faust, Birmingham, Ala.

Application May 29, 1957, Serial No. 660,386

2 Claims. (Cl. 304—5)

This invention relates to a mechanic's sawhorse. It has for its main objects to provide such a sawhorse that will be highly satisfactory for the purpose intended, simple in structure, cheap to manufacture, easy to keep in serviceable condition, and extremely durable.

A further object is to provide such a sawhorse that will be easy to assemble and disassemble for use and disassemble for transporting thereof in a very much less bulky condition as compared to the rigid fixed type of sawhorse.

Other objects and advantages will appear from the drawings and description.

Figure 10:
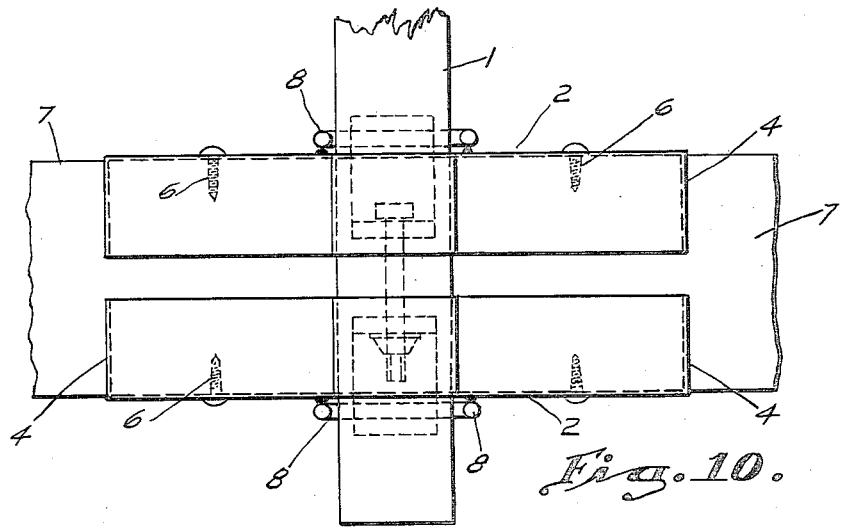
Figures 11, 12:
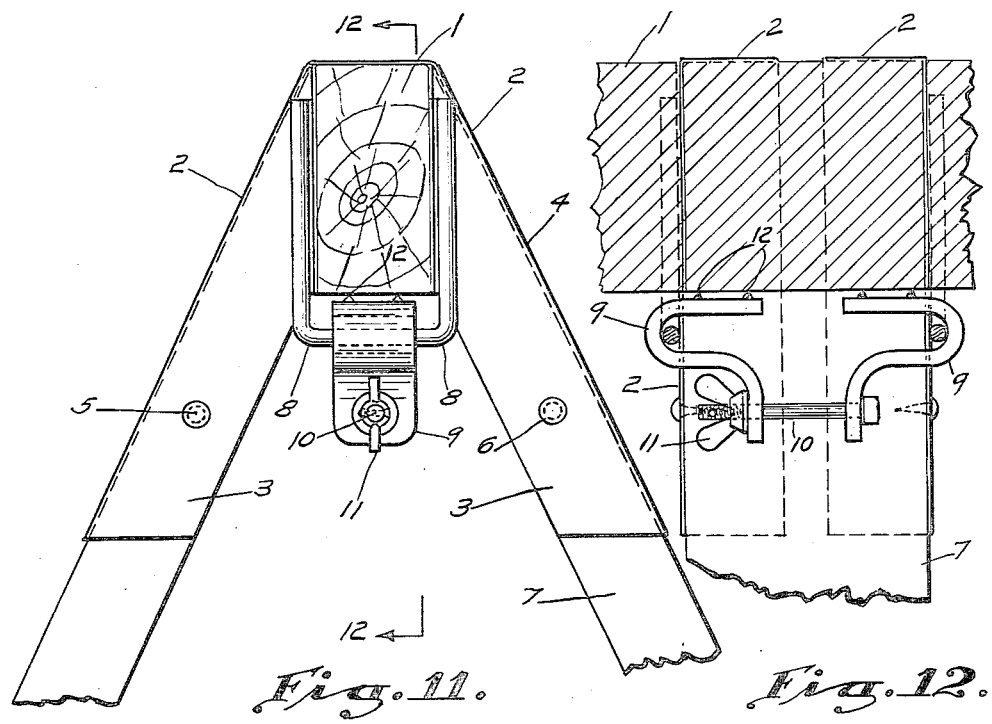

By referring generally to the drawings it will be observed that Fig. 1 is a side elevational view of a sawhorse made according to this invention; Fig. 2 is an end view of Fig. 1; Fig. 3 is a top plan enlarged view of one unit of the double metal brackets for holding the parts together for use; Fig. 4 is an enlarged end view of a bracket unit and showing in broken lines parts of legs; Fig. 5 is an enlarged top view of a clamp with bolt therein; Fig. 6 is a side view of the clamp shown in Fig. 5; Fig. 7 is a plan view of the metal before it is formed into a bracket unit; Fig. 8 is a detail view of a bolt as used in a bracket; Fig. 9 is an end view of Fig. 8; Fig. 10 is a top plan view showing a double bracket assembly mounted on part of the main top piece made of wood and parts of two legs made of wood; Fig. 11 is an end view of the parts shown in Fig. 10; and Fig. 12 is a sectional view on line 12—12 of Fig. 11.

Similar reference numerals refer to similar parts throughout the several views.

Referring to the drawings in detail it will be seen that the sawhorse comprises a main top piece 1 made preferably of wood that is held between two similar double brackets 2 that are formed in the shape of an inverted V with their side portions 3 bent at a right angle compared to their outer faces 4 with screw holes 5 in their sides for screws 6 to be inserted in the legs of wood 7 that have their upper ends cut at an angle to fit against the sides of the main top piece and in the double brackets. Each double bracket is provided with two round in cross section pieces 8 shaped as the letter U and attached by their prong portions to the brackets with the closed ends below the top main piece. Two curved pieces 9 with a bolt 10 and wing nut 11 are for the purpose of holding the brackets in place for use as a result of the integral pointed portions 12 on the curved pieces being forced into the under face of the main top piece when the curved pieces are drawn tightly together by the bolts and nuts thereon.

From the foregoing it will appear that the sawhorse is adapted for being assembled for use by first placing the brackets upon the top main piece, then inserting the upper ends of the legs into the brackets, then inserting the screws into the legs, then placing the curved pieces with their upper portions through the open spaces in the U shaped pieces, then inserting the bolts in the lower ends of the curved pieces, then tighten the bolts to force the pointed portions into the under face of the main top pieces. The reverse of these actions will disassemble the sawhorse for easy transportation thereof.

The sawhorse may be made of any material suitable for the purpose, but I prefer to use good grades of wood and rust proof metal; also its parts may be made in different sizes and capacities depending on how and where to be used.

While I have shown and described the preferred embodiment of my invention, I do not wish to limit same to the exact and precise details of structure, and reserve the right to make all modifications and changes so long as they remain within the scope of the invention and the following claims.

Having described my invention I claim:

1. A mechanic's sawhorse of the class described comprising, a main top supporting piece, two similar double brackets, each of said double brackets being in two parts formed as inverted V shapes and having a flange bent at a right angle to form outer faces and end faces, said end faces having screw holes therein, a round in cross section U shaped part attached by its prong portions on each of the bracket parts with the closed end of the U part extending below the bottom face of the said main top piece, two legs having their top ends formed slanting, said legs having their slanting portions inserted between said double brackets; four curved clamps, each of said clamps being substantially U shaped in its edge portion and having one of its prongs bent in its end portion away from the other prong, said bent away portion having a bolt hole therein, the outer face of the other prong having a plurality of integral pointed portions; two said U shaped clamps being mounted in each double bracket and positioned adjacent the under face of the said top supporting piece with part of the U shaped clamps inserted through the extended portions of the round U shaped parts attached to the brackets, a bolt inserted through the holes in the U shaped clamps, a wing nut on the bolt, said bolt and nut holding the double bracket in tight condition on the main top piece with the said pointed portions adjacent the under face of the top main piece; a plurality of screws, said screws being inserted through said screw holes and into said legs.

2. A mechanic's sawhorse of the character described comprising, a main top part made of wood, two similar double brackets made of metal and mounted on the wood piece, each of said double brackets being in two parts formed as inverted V shapes with the point of the V off, said parts having a flange bent at a 90 degree angle to thus form outer faces and end faces, said end faces having screw holes therethrough, a round in cross section U shaped part attached by its prong portions on each of the bracket V shaped parts with the closed end of the U part extending below the bottom face of the top wood part, two legs inserted in each double bracket, said legs having their top ends formed wedge shape, said wedge shaped portions being positioned between the units of the double bracket; four curved clamps, each of said clamps being made of flat metal bar and being substantially U shaped in its edge portion and having one of its prongs bent in its end portion at a 90 degree angle and away from the other U prong, said bent away portion having a bolt hole therethrough, the outer flat face of the other prong having a plurality of integral pointed portions; two said U shaped clamps being mounted in each double bracket and positioned adjacent the under face of the said top supporting piece with part of the U shaped clamps inserted through the extended portions of the round U shaped parts attached to the brackets, a bolt inserted through the holes in the U shaped clamps, a wing nut on the bolt, said bolt and nut holding the double bracket in tight condition on the main top piece with the said pointed portions adjacent the under face of the top main piece; a plurality of screws, said screws being inserted through said screw holes and into said legs.

References Cited in the file of this patent

UNITED STATES PATENTS

| | | |
|---|---|---|
| 1,685,283 | Gibson | Sept. 25, 1928 |
| 2,317,444 | Dalton | Apr. 27, 1943 |
| 2,330,766 | Walstrom | Sept. 28, 1943 |
| 2,753,223 | Anderson | July 3, 1956 |

FOREIGN PATENTS

| | | |
|---|---|---|
| 762,839 | Great Britain | Dec. 5, 1956 |